US010939243B2

(12) United States Patent
Chheda et al.

(10) Patent No.: US 10,939,243 B2
(45) Date of Patent: Mar. 2, 2021

(54) SELECTING A MESSAGING PROTOCOL FOR TRANSMITTING DATA IN CONNECTION WITH A LOCATION-BASED SERVICE

(71) Applicant: Uber Technologies, Inc., San Francisco, CA (US)

(72) Inventors: Deepti Chheda, San Francisco, CA (US); Nicholas Cobb, San Francisco, CA (US); Adam Noffsinger, San Francisco, CA (US); Nikunj Aggarwal, San Francisco, CA (US); Vincent Fong, San Francisco, CA (US); Domenic Anthony Narducci, IV, San Francisco, CA (US); Osman Haque, San Francisco, CA (US); Ashwin Neurgaonkar, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/662,846

(22) Filed: Oct. 24, 2019

(65) Prior Publication Data

US 2020/0128361 A1    Apr. 23, 2020

Related U.S. Application Data

(63) Continuation of application No. 16/249,153, filed on Jan. 16, 2019, now Pat. No. 10,492,032, which is a
(Continued)

(51) Int. Cl.
*H04W 4/029* (2018.01)
*H04L 12/58* (2006.01)
(Continued)

(52) U.S. Cl.
CPC ............ *H04W 4/029* (2018.02); *G06Q 10/02* (2013.01); *G06Q 50/30* (2013.01); *G08G 1/202* (2013.01); *H04L 51/066* (2013.01); *H04L 67/306* (2013.01)

(58) Field of Classification Search
CPC ..... H04L 51/066; H04L 67/306; G06Q 10/02; G06Q 50/30; G08G 1/202; H04W 4/029
See application file for complete search history.

(56) References Cited

U.S. PATENT DOCUMENTS 5,945,919 A    8/1999    Trask
6,356,838 B1   3/2002    Paul
(Continued)

FOREIGN PATENT DOCUMENTS

CN    106651728    5/2017
EP    2682868      1/2014
(Continued)

OTHER PUBLICATIONS

Exam Report No. 1 in AU 2014386266 dated Feb. 14, 2020.
(Continued)

*Primary Examiner* — Austin J Moreau
(74) *Attorney, Agent, or Firm* — Mahamedi IP Law LLP

(57) ABSTRACT

A system can receive a request for a transport service from a first device. The request can include a user identifier associated with a first user of the first device, contact information associated with a second user, and a pickup location information. The system can make a determination whether a user account associated with the second user is stored in a user database using the contact information in the request. Based on the determination, the system can select a messaging protocol to transmit data to a second device associated with the contact information. The system can
(Continued)

transmit a message corresponding to the transport service to the second device using the selected messaging protocol.

20 Claims, 9 Drawing Sheets

Related U.S. Application Data continuation of application No. 14/796,309, filed on Jul. 10, 2015, now Pat. No. 10,212,536.

(51) Int. Cl.
*G06Q 10/02* (2012.01)
*G06Q 50/30* (2012.01)
*G08G 1/00* (2006.01)
*H04L 29/08* (2006.01)

(56) References Cited

U.S. PATENT DOCUMENTS

| | | |
|---|---|---|
| 6,453,298 B2 | 9/2002 | Murakami |
| 6,756,913 B1 | 6/2004 | Mourad |
| 7,248,184 B2 | 7/2007 | Gelhar |
| 7,657,256 B2 | 2/2010 | Bates |
| 7,817,990 B2 | 10/2010 | Pamminger |
| 7,917,153 B2 | 3/2011 | Orwant et al. |
| 7,970,749 B2 | 6/2011 | Uhlir |
| 8,065,342 B1 | 11/2011 | Borg |
| 8,339,251 B2 | 12/2012 | Roberts |
| 8,504,406 B2 | 8/2013 | Miller |
| 8,538,374 B1 | 9/2013 | Haimo et al. |
| 8,554,608 B1 | 10/2013 | O'Connor |
| 8,624,727 B2 | 1/2014 | Saigh et al. |
| 8,630,987 B2 | 1/2014 | Prada Gomez |
| 8,719,391 B2 | 5/2014 | Hamalainen et al. |
| 8,768,294 B2 | 7/2014 | Reitnour et al. |
| 8,775,070 B1 | 7/2014 | Bhatia |
| 8,855,916 B2 | 10/2014 | Meredith et al. |
| 9,147,335 B2 | 9/2015 | Raghunathan |
| 9,244,147 B1 | 1/2016 | Soundararajan |
| 9,372,090 B2 | 6/2016 | Tucker |
| 9,424,515 B2 | 8/2016 | Atlas |
| 9,631,933 B1 | 4/2017 | Aula |
| 10,082,793 B1 | 9/2018 | Glaser |
| 10,203,212 B2 | 2/2019 | Mazzella |
| 2002/0143587 A1 | 10/2002 | Champernowne |
| 2004/0158483 A1 | 8/2004 | Lecouturier |
| 2006/0235739 A1 | 10/2006 | Levis et al. |
| 2007/0093247 A1 | 4/2007 | Raziq |
| 2007/0150375 A1 | 6/2007 | Yang |
| 2008/0014908 A1 | 1/2008 | Vasant |
| 2008/0027772 A1 | 1/2008 | Gernega |
| 2008/0114629 A1 | 5/2008 | Pavlov |
| 2008/0122691 A1 | 5/2008 | Carani et al. |
| 2008/0125964 A1 | 5/2008 | Carani |
| 2008/0195428 A1 | 8/2008 | O'Sullivan |
| 2009/0005963 A1 | 1/2009 | Jarvinen |
| 2009/0006182 A1 | 1/2009 | Gammon |
| 2009/0216600 A1 | 8/2009 | Hill |
| 2009/0296990 A1 | 12/2009 | Holland |
| 2010/0017126 A1 | 1/2010 | Holcman |
| 2010/0070168 A1 | 3/2010 | Sumcad |
| 2010/0280852 A1 | 11/2010 | Huang |
| 2011/0112768 A1 | 5/2011 | Doyle |
| 2011/0231493 A1 | 9/2011 | Dyor |
| 2011/0238300 A1 | 9/2011 | Schenken |
| 2011/0246246 A1 | 10/2011 | Johnson |
| 2011/0307282 A1 | 12/2011 | Camp |
| 2012/0041675 A1 | 2/2012 | Juliver et al. |
| 2012/0046110 A1 | 2/2012 | Amaitis et al. |
| 2012/0089326 A1 | 4/2012 | Bouve |
| 2012/0200411 A1 | 8/2012 | Best |
| 2012/0232943 A1 | 9/2012 | Myr |
| 2012/0233246 A1 | 9/2012 | Guemez |
| 2012/0239452 A1 | 9/2012 | Trivedi |
| 2012/0290337 A1 | 11/2012 | Helmy |
| 2012/0306659 A1 | 12/2012 | Ben-Dayan |
| 2013/0054281 A1 | 2/2013 | Thakkar |
| 2013/0132140 A1 | 5/2013 | Amin |
| 2013/0162425 A1 | 6/2013 | Raghunathan |
| 2013/0218455 A1 | 8/2013 | Clark |
| 2013/0226365 A1 | 8/2013 | Brozovich |
| 2013/0290200 A1 | 10/2013 | Singhal |
| 2013/0310053 A1 | 11/2013 | Srivastava et al. |
| 2013/0332527 A1 | 12/2013 | Du |
| 2013/0339076 A1 | 12/2013 | Baranda |
| 2014/0066090 A1 | 3/2014 | Henderson |
| 2014/0087711 A1 | 3/2014 | Geyer |
| 2014/0108201 A1 | 4/2014 | Frechett |
| 2014/0129951 A1 | 5/2014 | Amin |
| 2014/0156410 A1 | 6/2014 | Wuersch |
| 2014/0172727 A1 | 6/2014 | Abhyanker |
| 2014/0173511 A1 | 6/2014 | Lehmann |
| 2014/0207375 A1 | 7/2014 | Lerenc |
| 2014/0279707 A1 | 9/2014 | Joshua |
| 2014/0365250 A1 | 12/2014 | Ikeda |
| 2015/0031388 A1 | 1/2015 | Chatterjee et al. |
| 2015/0032484 A1 | 1/2015 | Mermelstein |
| 2015/0055178 A1 | 2/2015 | Ishibashi |
| 2015/0073645 A1 | 3/2015 | Davidsson |
| 2015/0081581 A1 | 3/2015 | Gishen |
| 2015/0100238 A1 | 4/2015 | Cai |
| 2015/0148060 A1 | 5/2015 | Parab et al. |
| 2015/0154810 A1 | 6/2015 | Tew |
| 2015/0161564 A1 | 6/2015 | Sweeney |
| 2015/0254581 A1 | 9/2015 | Brahme |
| 2015/0262430 A1 | 9/2015 | Farrelly |
| 2015/0323327 A1 | 11/2015 | Lord |
| 2015/0323330 A1 | 11/2015 | Lord |
| 2015/0323331 A1 | 11/2015 | Lord |
| 2015/0339923 A1 | 11/2015 | Konig |
| 2015/0339928 A1 | 11/2015 | Ramanujam |
| 2015/0352128 A1 | 11/2015 | Lord |
| 2016/0014561 A1 | 1/2016 | Inzer |
| 2016/0019496 A1 | 1/2016 | Gorlin |
| 2016/0026935 A1 | 1/2016 | Botea |
| 2016/0026936 A1 | 1/2016 | Richardson |
| 2016/0034845 A1 | 2/2016 | Hiyama |
| 2016/0132792 A1 | 5/2016 | Rosnow |
| 2016/0191637 A1* | 6/2016 | Memon ........... H04W 4/024 |
| | | 701/522 |
| 2016/0217669 A1 | 7/2016 | Benoit |
| 2016/0231129 A1 | 8/2016 | Erez |
| 2016/0253617 A1 | 9/2016 | Truong |
| 2016/0301698 A1 | 10/2016 | Katara |
| 2016/0321771 A1 | 11/2016 | Liu |
| 2016/0364679 A1 | 12/2016 | Cao |
| 2016/0364823 A1 | 12/2016 | Cao |
| 2016/0370194 A1 | 12/2016 | Colijn |
| 2017/0012920 A1 | 1/2017 | Chheda |
| 2017/0115125 A1 | 4/2017 | Outwater |
| 2017/0147959 A1 | 5/2017 | Sweeney |
| 2017/0169535 A1 | 6/2017 | Tolkin |
| 2017/0191841 A1 | 7/2017 | Marueli |
| 2017/0191845 A1 | 7/2017 | Marueli |
| 2017/0200249 A1 | 7/2017 | Ullrich |
| 2017/0240098 A1 | 8/2017 | Sweeney |
| 2017/0255881 A1 | 9/2017 | Ritch |
| 2017/0270794 A1 | 9/2017 | Sweeney |
| 2017/0271290 A1 | 9/2017 | Liao et al. |
| 2017/0272901 A1 | 9/2017 | Sweeney |
| 2017/0351977 A1 | 12/2017 | Bijor |
| 2018/0191595 A1 | 7/2018 | Tao |
| 2018/0306595 A1 | 10/2018 | Marueli |
| 2018/0315148 A1 | 11/2018 | Luo |
| 2018/0349825 A1 | 12/2018 | Yamamoto |
| 2018/0374350 A1 | 12/2018 | Sweeney |
| 2018/0375752 A1 | 12/2018 | Tao |
| 2019/0087754 A1 | 3/2019 | Farrelly |
| 2019/0109910 A1 | 4/2019 | Sweeney |
| 2019/0149945 A1 | 5/2019 | Chheda |
| 2019/0172353 A1 | 6/2019 | Chen |

(56) References Cited

U.S. PATENT DOCUMENTS

| | | |
|---|---|---|
| 2019/0197460 A1 | 6/2019 | Truong |
| 2019/0212157 A1 | 7/2019 | Wu |
| 2020/0145503 A1 | 5/2020 | Sweeney |

FOREIGN PATENT DOCUMENTS

| | | |
|---|---|---|
| EP | 2879410 | 6/2015 |
| EP | 3046058 | 7/2016 |
| JP | 2004-302942 | 10/2004 |
| KR | 10-2011-0061568 | 6/2011 |
| WO | WO 2003/040972 | 5/2005 |
| WO | WO 2011-120161 | 10/2011 |
| WO | WO 2013-166216 | 11/2013 |
| WO | WO 2017/079222 | 5/2017 |

OTHER PUBLICATIONS

Office Action in CA 2,942,918 dated Jun. 2, 2020.
ISR and Written Opinion dated Apr. 30, 2019 in PCT/US2019/012902.
ISR and Written Opinion in PCT/US2017/023350 dated Jun. 29, 2017.
ISR and Written Opinion in PCT/US2017/023343 dated Jul. 6, 2017.
EESR in EP 17771000.1 dated Mar. 21, 2019.
ISR and Written Opinion in PCT/US2018/055256 dated Jan. 30, 2019.
How to request multiple Uber vehicles, Aug. 15, 2013 (https://www.wikihow.com/ Request-Multiple-Uber-Vehicles.
How to book two cabs at the same time in Uber, Jun. 30, 2017 (https://fastandclean.org/ book-two-cabs-time-uber).
Is it possible to order 2 Ubers at the same time, Jul. 13, 2015 (https://web.archive.org/web/20150801000000*/https://android.Stackexchange.com/questions/114027/is-it- possible-to-order-2-ubers-at-the-same-time.
Written Opinion in PCT/US2018/055256 dated Jul. 19, 2019.
EESR in EP 16824968.8 dated Jan. 30, 2019.
Exam Report No. 1 in AU 2016293831 dated Aug. 28, 2019.
International Search Report in PCT/US2015/021227 dated Jun. 18, 2015.
International Search Report and Written Opinion in PCT/US2016/019895 dated Jun. 29, 2016.
IPRP in PCT/US2016/019895 dated Sep. 8, 2017.
EESR in EP 15765578 dated Oct. 25, 2017.
M.E.T. Horn, "Multimodal and demand-responsive passenger transport systems: a modeling framework with embedded control systems", Transportation Research Part A 36, 167-188 (2002) Year: 2000.
Exam Report in IN 201647031195 dated Oct. 30, 2019.
Exam Report No. 1 in AU 2015231331 dated Nov. 13, 2019.

* cited by examiner

US 10,939,243 B2

SELECTING A MESSAGING PROTOCOL FOR TRANSMITTING DATA IN CONNECTION WITH A LOCATION-BASED SERVICE

CROSS-REFERENCE TO RELATED APPLICATIONS

This application is a continuation of U.S. patent application Ser. No. 16/249,153, filed Jan. 16, 2019, which is a continuation of U.S. patent application Ser. No. 14/796,309, filed Jul. 10, 2015 (now U.S. Pat. No. 10,212,536), which applications are hereby incorporated by reference in their entirety.

BACKGROUND

A network service can provide a platform to enable users to request and receive various services through use of computing devices. The network service can typically select a service provider to provide the service for a user based on user-specified data from the request. The network service can provide information about the selected service provider to the requesting user's computing device.

DETAILED DESCRIPTION

Figure 1:
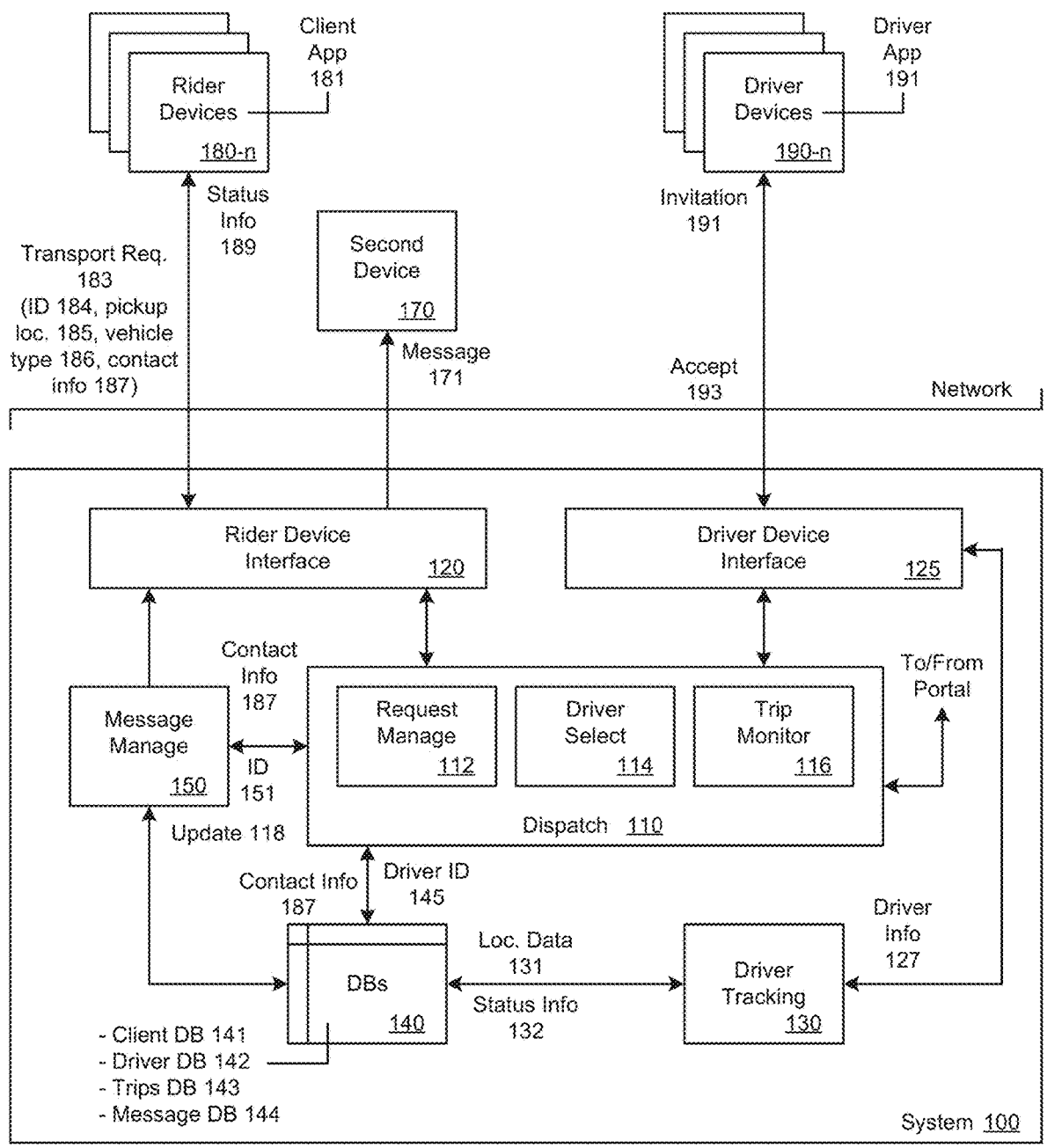
FIG. 1 illustrates an example system to generate and transmit data in connection with a transport service, under an embodiment.

According to examples described herein, a network service can selectively determine a messaging protocol and/or channel to use to transmit data and information in connection with a location-based service. The network service can enable users to request location-based services through use of computing devices, and in some examples, can select a messaging protocol and/or channel to use to transmit data about a location-based service to a computing device based on the contact information included in a request.

In one example, a network service can be implemented by a computing system or a set of computing systems to receive requests for transport services and to arrange the transport services to be provided by selected transport providers. A first user can operate a first computing device to transmit a request for a transport service. Typically, the request can include a user identifier (ID) of the first user and a user-specified pickup location in which the first user wants to be picked up by a transport provider (e.g., a driver). In some examples, however, the first user may want to specify a pickup location for a second user who is to be picked up by a driver. In such examples, the request for the transport service can also include contact information associated with the second user. The computing system can receive the request, process the request, and select a messaging protocol and/or channel to transmit data in connection with the transport service to a second computing device associated with the contact information.

The computing system can identify, from the request, the contact information associated with the second user and perform a search for an associated user profile or account in one or more user databases. According to examples, each user that has registered or signed up with the network service can have an associated user profile or account in a client database that is accessible by the computing system. The computing system can use the contact information of the second user to make a determination whether a user profile associated with the second user is stored in the client database. Based on this determination, the computing system can select a messaging protocol and/or channel to transmit data to the second user's computing device, such as information corresponding to the transport service.

Among other technical effects, some examples described herein provide a mechanism to transmit data to a computing device using a particular messaging protocol and/or channel. Accordingly, examples described enable a user to make a request for a transport service for another user, who may or may not have a smartphone that has capabilities for running a designated service application. In such examples, information about the transport service can be transmitted to the other user's device via a messaging protocol that is compatible with the other user's device. Still further, among other benefits and technical effects achieved with examples as described, an enhanced user interface can be provided on a designated service application running on a computing device based on detecting an event(s) on the computing device. Such an enhanced user interface can enable a user of the service application to perform additional operations that were otherwise unavailable to that user and can also provide visual feedback to the user.

Still further, another technical effect and benefit provided with examples includes a system and method which generates relevant (e.g., for transport) messages or notifications using indirect inputs or signals. In some examples, a system is generated which generates highly relevant notifications for communications to a user using a messaging transport or protocol that is determined to be suitable for the user. The timing and content of such notifications can thus be context and user-specific, and the protocol determination can be based on user determinations. In this respect, examples provide a benefit and technical effect with improved efficiency of notification/messaging systems when implemented in context of a mobile network service environment. Still further, some examples provide improved efficiency with respect to network services which arrange transport related services.

As used herein, a user or rider device, a driver device, a computing device, and/or a mobile computing device refer to devices corresponding to desktop computers, cellular devices or smartphones, personal digital assistants (PDAs), laptop computers, tablet devices, etc., that can provide network connectivity and processing resources for communicating with a network service over one or more networks. Rider devices and driver devices can each operate a designated service application (e.g., a client application and a driver application, respectively) that is configured to communicate with the network service (e.g., a server or computing system that implements the network service). A driver device can also correspond to a computing device or custom hardware that is installed in or incorporated with a vehicle, such as part of the vehicle's on-board computing system.

Still further, examples described herein relate to a variety of services, such as a transport service, a food truck service, a delivery service, an entertainment service, a house cleaning service, etc., or generally, any on-demand service or any variable-priced service and/or post-paid transaction between a user and a service provider or provider of goods. Although examples described herein refer to a rider that requests a transport service for purpose of simplicity, in general, a rider can refer to an individual operating a device that makes a request for a location-based service, such as described above. In some examples, the network service can be implemented or operated by an entity that provides goods or services for purchase or arranges for goods or services to be purchased through the use of computing devices and network(s).

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system to generate and transmit data in connection with a transport service. In the example of FIG. 1, a service arrangement system 100 (e.g., that implements the network service) includes a dispatch 110, a rider device interface 120, a driver device interface 125, a driver tracking component 130, a plurality of databases 140, and a message manage 150. The plurality of databases 140 can include, for example, a rider or client database 141, a driver database 142, a trips database 143, a message database 144, and other databases (not illustrated in FIG. 1 for purpose of simplicity). The client database 141 can store a plurality of user profiles or accounts that are associated with riders and/or the rider devices 180 operated by those riders. Similarly, the driver database 142 can store a plurality of driver profiles or accounts that are associated with drivers and/or the driver devices operated by those drivers. The trips database 143 can store trip entries each corresponding to a transport service and can each be associated with a rider and/or a driver. The message database 144 can include textual and/or graphical content (e.g., text templates) that can be used for generating messages.

In some examples, each of a plurality of rider devices 180 and each of a plurality of driver devices 190 (or service provider devices) can communicate with the system 100 over one or more networks using, for example, respective designated service applications that are configured to communicate with the system 100. For example, each rider device 180 can store and run a designated client application 181 that enables communications to be exchanged between that rider device 180 and the system 100. Similarly, each driver device 190 can store a designated driver application 191 that enables communications to be exchanged between that driver device 190 and the system 100. As described herein, the components of the system 100 can combine to perform operations to receive and process requests for transport services and to transmit data to computing devices using a specified messaging protocol. Logic can be implemented with various applications (e.g., software) and/or with hardware of a computer system that implements the system 100.

Depending on implementation, one or more components of the system 100 can be implemented on network side resources, such as on one or more servers or computing systems. The system 100 can also be implemented through other computer systems in alternative architectures (e.g., peer-to-peer networks, etc.). As an addition or an alternative, some or all of the components of the system 100 can be implemented on rider or driver devices, such as through applications that operate on the rider devices 180 and/or the driver devices 190. For example, a client application 181 and/or a driver application 191 can execute to perform one or more of the processes described by the various components of the system 100. The system 100 can communicate over a network, via a network interface (e.g., wirelessly or using a wireline), to communicate with the one or more rider devices 180 and the one or more driver devices.

The system 100 can communicate, over one or more networks, with rider devices 180 and driver devices 190 using a rider device interface 120 and a device interface 125, respectively. The device interfaces 120, 125 can each manage communications between the system 100 and the respective computing devices 180, 190. The rider devices 180 and the driver devices 190 can individually operate client applications 181 and driver applications 191, respectively, that can interface with the device interfaces 120, 125 to communicate with the system 100. According to some examples, these applications can include or use an application programming interface (API), such as an externally facing API, to communicate data with the device interfaces 120, 125. The externally facing API can provide access to the system 100 via secure access channels over the network through any number of methods, such as web-based forms, programmatic access via RESTful APIs, Simple Object Access Protocol (SOAP), remote procedure call (RPC), scripting access, etc.

Still further, while FIG. 1 illustrates one rider device interface 120 and one driver device interface 125 for purpose of simplicity, in one example, the system 100 can include multiple rider device interfaces 120 and/or multiple driver device interfaces 125. For example, the system 100 can include a first rider device interface for communicating with a rider device via an application message, a second rider device interface for communicating with a rider device via a text message, a third rider device interface for communicating with a rider device via an email message, etc. Depending on the messaging protocol and/or channel to be used by the system 100 to communicate data with a device, such as the second device 170, the system 100 can use one of respective rider device interfaces 120.

As described herein, an operator of a first rider device 180 (e.g., a first user) can interact with a respective client application 181 to make a request for a transport service. Typically, the first user can provide input via the client application 181 to specify a pickup location (and/or a destination location) and to select a specific vehicle type (in cases where multiple vehicle types are available at the pickup location) for the transport service. The system 100 can receive the request and arrange the transport service by selecting a driver for the first user. However, in some instances, the first user may want to request a transport service for another user (e.g., a second user), such as a friend, a spouse, a family member, etc., that may be located elsewhere or remote from the first user. In such an example, the system 100 and/or the client application 181 can provide a mechanism to enable the first user to make a request for a transport service (e.g., request a trip) and transfer that trip to the second user.

In one example, when the first user launches the client application 181, the client application 181 can access a geo-aware resource of the rider device 180 (e.g., a global position system (GPS) receiver) to determine the current location of the first user (e.g., the rider device 180). The first user can provide input on the client application 181 (e.g., using a touch-sensitive display of the rider device 180) to specify a pickup location 185 for the second user. The pickup location 185 can be determined in response to the first user providing an address in a text field or moving a pin (or graphic icon) to a location on a map user interface on the client application 181. The first user can also select a vehicle type 186 for the transport service.

The client application 181 can provide a user interface or selectable feature(s) to enable the first user to request a transport service for another person. According to one example, when an input is provided on the client application 181 for a pickup location, the client application 181 can determine whether the pickup location 185 is a predetermined distance away from the current location of the first user by performing one or more distance computations. The client application 181 can determine the distance between the pickup location 185 (e.g., a location data point, such as a latitude and longitude coordinate) and the current location data point. The distance can be a Cartesian distance measurement or a Haversine distance measurement, depending on implementation. If the client application 181 determines that the pickup location 185 is a predetermined threshold distance away from the current location (e.g., one block, two hundred meters, or one mile, etc.), the client application 181 can display a selectable feature for enabling the first user to request for another person. Alternatively, in other examples, the client application 181 can provide a selectable feature for enabling the first user to request a transport service for another user in various menus or settings. For example, before or after a transport service is requested, the first user can select a selectable feature for a menu that provides additional options or services that are provided by the network service, including the selectable feature for transferring the transport service to another user.

In either implementation, when such a selectable feature is selected by the first user, the client application 181 can display a contacts user interface to enable the first user to input (or select from the first user's contacts list or database) a contact information 187 of the other person that the first user wants to request a transport service for (e.g., referred to herein as a second user). The contact information 187 can include a phone number, a name, an email address, and/or other identifying information of the second user. When the first user provides the contact information 187 on the client application 181 and makes the request for transport service for the second user, the client application 181 can generate and transmit a request 183 for transport service to the system 100 over one or more networks. The request 183 can include a user ID 184 of the first user, the pickup location 185 of the second user, and the contact information 187 of the second user. In some examples, the request 183 may also include the vehicle type information 186, a destination location, and/or the current location of the first user.

The dispatch 110 can receive the request 183 via the rider device interface 120. In one example, the request manage component 112 of the dispatch 110 can process the request 183 for the first user. The request manage component 112 can create a trip entry for the requested transport service in the trips database 143 and associate the user ID 184 of the first user with the trip entry (or an identifier of the trip entry). The trip entry can correspond to a data structure that corresponds to a requested transport service and can store or be associated with information about the transport service. In addition, the request manage component 112 can determine the user-specified parameters or information from the request 183, and can provide the pickup location 185 and the vehicle type 186 to the driver select component 114. The request manage component 112 can also store the user-specified parameters with the trip entry.

Still further, in one example, the request manage component 112 can determine whether the request 183 is a request for transport for the requesting user (i.e., the first user) or whether the request 183 is a request for transport for another user (i.e., the second user). For example, if the request manage component 112 determines that the request 183 includes both a user ID 184 of a requesting user and contact information 187 that does not correspond to the requesting user's profile, the request manage component 112 can determine that the transport service is to be provided for the other user (and not the requesting user). On the other hand, if the request 183 does not include contact information 187, the request manage component 112 can determine that the request for transport service is for the first user.

Referring back to the example of FIG. 1, the request manage component 112 can determine that the request 183 is made by the first user for another user, e.g., based on the existence of the contact information 187 in the request 183. While a user profile or account associated with the first user exists or is stored in the client database 141 (e.g., as a result of registering or signing up with the network service), the second user may or may not necessarily have an associated user profile in the client database 141. For example, the second user may not have ever previously signed up with the network service or may not have a mobile computing device that has device capabilities for running a designated client application 181 (e.g., the device may be a "dumb" device). The request manage component 112 can search the client database 141 using the contact information 187 from the request 183 to determine whether a user profile or account exists in the client database 141 that corresponds to or includes the contact information 187. In other words, the request manage component 112 can determine whether the second user is a user of the network service.

If the second user has an associated profile or account, the request manage component 112 can associate or add an identifier associated with the second user's profile to the trip entry. In addition, because the second user has an associated profile with the network service, the request manage component 112 can determine that communications in connection with the transport service can be made using a first messaging protocol and/or channel, such as an application push notification or an in-application message. On the other hand, if the second user does not have an associated profile or account with the network service, the request manage component 112 can determine that another non-application based messaging protocol and/or channel, e.g., a second messaging protocol, is to be used to communicate data or messages to the second user's device. In examples described herein, a second messaging protocol can correspond to an email protocol (e.g., POP, IMAP, SMTP, etc.) or a text messaging protocol (e.g., SMS, MMS, instant messaging, etc.). The request manage component 112 can indicate, to a messaging component of the system 100, what messaging protocol to use to communicate with the second user.

According to some examples, the system 100 can include a message manage 150 that can structure or format the data or messages that are to be transmitted to computing devices based on selected messaging protocols and/or corresponding channels. When a message is to be transmitted to a computing device, the dispatch 110 can instruct the message manage 150 to transmit the message using the specified messaging protocol. The message manage 150 can communicate with the one or more rider device interfaces 120 to transmit the message accordingly. In one example, if the second user has an associated profile in the client database 141, the request manage 112 can provide the user ID 151 associated with the second user (or associated with the second user's profile) to the message manage 150. As an addition or an alternative, the request manage 112 can also provide information about the selected messaging protocol to the message manage 150. The message manage 150 can determine, from the user ID 151 and/or the information about the selected messaging protocol, that data is to be transmitted to the second device 170 of the second user using the selected messaging protocol (e.g., the first messaging protocol).

On the other hand, if the second user does not have an associated profile in the client database 141, the request manage 112 can provide the contact information 187 (that is determined or extracted from the request 183) to the message manage 150. The message manage 150 can determine, from the contact information 187 and/or the information about the selected messaging protocol, that data is to be transmitted to the second device 170 of the second user using the selected messaging protocol (e.g., the second messaging protocol). In some examples, if the message manage 150 receives the contact information 187 as opposed to the user ID 151, the message manage 150 can determine that communications to the second device 170 are to be done using the second messaging protocol as opposed to the first messaging protocol.

As described herein, various messages can be transmitted to the rider device 180 of the first user (who requested the transport service) and/or to the second device 170 of the second user in connection with the transport service. In one example, each time information about a transport service is to be transmitted to the rider device 180 and/or the second device 170, the dispatch 110 can provide a transport service update 118 along with either the user ID 151 of the second user or the contact information 187 of the second user to the message manage 150. The transport service update 118 can include information about the transport service and/or instructions on what message or content is to be used to generate the message. According to an example, the message manage 150 can access the message database 144 to determine the content of the message (e.g., textual content, graphical content, and/or links to web content, etc.) and to generate and/or format the message to be transmitted based on the transport service update 118 and the selected messaging protocol. As described herein, the different messages to be transmitted to the rider device 180 and/or the second device 170 can include one or more of, or a combination of, (i) information about a transport service having been requested for the second user by the first user, (ii) information about the pickup location of the second user, (iii) information about a transport service being arranged for the second user, e.g., a driver being selected, (iv) information about the selected driver and/or vehicle, (v) information about the status of the driver, (vi) information about the status of the transport service, e.g., where the second user or driver is on the trip, or (vii) other information in connection with the specific transport service.

Referring back to the dispatch 110, the driver select component 114 can select a driver for the second user based on the specified transport parameters in the request 183 (e.g., based on the pickup location 185 of the second user, the vehicle type 186, and/or a destination location of the second user). Depending on variations, the driver select component 114 can select a driver, having a vehicle of the requested vehicle type, based on the shortest distance or shortest estimated travel time to the pickup location 185 and/or based on the projected route to travel from the pickup location 185 to the destination location, if provided in the request 183. The driver select component 114 can access the driver database 142, which stores real-time or close to real-time driver information (e.g., such as the drivers' or driver devices' current locations and statuses) of those drivers that are within a specified region or distance of the pickup location 185 to perform the driver selection process based on the specified transport parameters.

For example, the driver tracking 130 can periodically receive driver information 127 from driver devices 190 via the driver applications 191 communicating with the driver device interface 125. The driver tracking 130 can store, for each driver that is operating the driver application 191, the driver information 127 about that driver's locations (referred to as location data 131) and that driver's statutes (referred to as status info 132) in the driver database 142. The status information for a driver can correspond to, for example, whether the driver is on-duty and available to provide transport, or occupied (e.g., providing transport for a rider and cannot provide transport), or partially occupied (e.g., providing transport but can also provide transport for a new requesting user). In one example, the driver application 191 can periodically determine the current location of the driver device 190 using a GPS receiver of that driver device 190 and/or a wireless communication device(s) (e.g., Wi-Fi device), and can periodically provide the driver information 127 to the system 100 over one or more networks (e.g., using a cellular network). In this manner, the system 100 can store data about where the drivers are and the status of the drivers (e.g., on-duty and available, off-duty, on trip and providing transport, etc.).

The driver select component 114 can access the driver database 142 and select a driver to provide the transport service for the second user (e.g., identify the driver ID 145 of the driver). In response to selecting the driver, the dispatch 110 can transmit, via the driver device interface 125, an invitation 191 to the selected driver device 190 based on the driver ID 145. The driver application 191 can display the invitation 191 to enable the driver to accept or reject providing the transport service for the second user. The driver can provide input on the invitation user interface of the driver application 191 to either accept the invitation 191 or reject the invitation 191. Alternatively, the driver can allow the predetermined duration of time to accept the invitation 191 expire. If the driver accepts the invitation 191, the driver application 191 can transmit an acceptance message 193 indicating that the transport service has been accepted to the dispatch 110. The trip monitor component 116 of the dispatch 110 can receive the information indicating the driver's acceptance and determine that the transport service has been arranged for the second user.

Once the transport service has been arranged, the trip monitor component 116 can monitor the status and progress/performance of the trip, such as where the driver is relative to the pickup location 185, by receiving current driver location information 131 from the selected driver application 191 (e.g., periodically). In addition, the system 110 can provide information about the driver and that the transport service has been accepted to the rider device 180 of the first user and/or to the second device 170 of the second user.

For example, for the second user, the dispatch 110 can transmit a transport service update 118 to the message manage 150 (e.g., in this example, that the trip has been arranged). Based on the selected messaging protocol for communicating with the second device 170, the message manage 150 can generate a message 171 about the transport service being arranged for the second user and include information about the driver and/or the vehicle. In one example, the information can include the driver information (e.g., an image, a name, a ratings, etc.), a vehicle information (e.g., an image, a vehicle type name, a license plate number, etc.), and/or the location of the driver. The message manage 150 can communicate with the rider device interface 120 to transmit the message 171 to the second device 170 via the selected messaging protocol using the user ID 151 or the contact information 187. In some examples, the content of the message 171 can also be based on the selected messaging protocol.

Similarly, in some examples, the system 100 may also transmit information about the transport service to the first user. For the first user, the dispatch 110 can transmit status information 189 of the transport service by communicating with the client application 181 on the rider device 180. While the first user is not the one receiving the transport service, the first user may want to know the details of the trip and want to verify the identity and status of the driver. The status information 189, in this example, can similarly include information about the transport service being arranged for the second user and include information about the driver and/or the vehicle. Because the first user requested the transport service using the client application 181 and is an authorized user of the network service, the dispatch 110 can transmit information that the transport service has been arranged to the client application 181. In this manner, the dispatch 110 can provide the progress information to the rider device 180 so that the first can see the movement and location of the driver using the client application 181.

Still further, as the trip monitor component 116 monitors the progress of the driver and the transport service, other transport service updates 118 can be provided to the message manage 150 to cause other messages to be transmitted to the rider device 180 and/or the second device 170. For example, when the driver approaches or is within a predetermined distance of the pickup location 185 of the second user, the message manage 150 can provide a message 171 indicating that the driver is approaching the pickup location 185 to the second device 170 using the selected messaging protocol. The system 100 can also provide a similar status information 189 to the client application 181 of the rider device 180 of the first user. In this manner, regardless of whether the second user is an authorized user of the network service and regardless of the type of device the second user operates, the second user can view information about the transport service that was requested by the first user.

As an addition or an alternative, in one example, the system 100 can also make a call or request device information from the second device 170 before transmitting a message in connection with a transport service. For example, the second user may have a respective user profile in the client database 141 and a message 171 is to be transmitted to the second device 170 using a first messaging protocol (e.g., an application push notification). However, if the client application 181 is not currently installed or stored on the second device 170, the second device 170 may not be able to output or display the application push notification or message. In this example, the rider device interface 120 and/or the message manage 150 can receive feedback indicating that the second device 170 did not receive the message 171 using the first messaging protocol. In such an example, the message manage 150 can select another messaging protocol, e.g., the second messaging protocol (SMS) or another protocol that can be used to transmit the message 171 to the second device 170. This secondary selected protocol can be one that the system 100 can use to transmit the message 171 using the contact information 187 of the second user as opposed to the user ID 151.

In some examples, one or more messages that are transmitted to the second device 170 can include a link (e.g., a uniform resource locator) to enable the second user to view the real-time or close to real-time progress of the driver and/or the trip. The link can be associated with a web page or website, for example, provided by the network service that can include information about the progress of the trip that is monitored by the trip monitor component 116. The dispatch 110 can provide the trip information (e.g., the current location of the driver, the status of the driver, etc.) as part of the web page via a portal. When the link is selected by the second user and the second device 170 has web browsing capabilities to open the web page, the second device 170 can display content corresponding to the transport service. Such content can be similar to the content displayed on a user interface of the client application 181 (e.g., such as on the client application that is running on the first user's device 180).

When the trip monitor component 116 determines that the transport service has been completed, e.g., via driver input on the driver application 191 or by receiving other signals, the dispatch 110 can communicate with a fare determination component (not shown in FIG. 1 for purpose of simplicity) to determine the amount for the transport service. The fare amount can be paid using a payment profile (associated with a particular payment instrument, such as a credit card or a debit card or electronic wallet account, etc.) associated with the first user because the first user requested the transport service (despite not having actually received the benefit of the transport service). The system 100 can communicate with a payment processing system (also not shown in FIG. 1 for purpose of simplicity) to charge the first user the respective amount, as opposed to the second user.

Alternatively, in one example, if the request manage 112 determines that the second user has an account in the client database 141, during the progress of the transport service, the system 100 can enable the first user to request to share the fare for the transport service with the second user. The client application 181 can provide a selectable feature that, when selected by the first user, enables the first user to confirm to share the fare for the transport service with the user that he or she has requested a trip for. Such a selectable feature may not be displayed on the client application 181 if the second user does not have an associated account with the network service. If the first user makes the request to share the fare, the system 100 can determine the payment profile associated with the second user from the second user's account and communicate with the payment processing system to charge both users (e.g., equally or in an amount specified by the first user and/or the second user).

Methodology

Figure 2A:
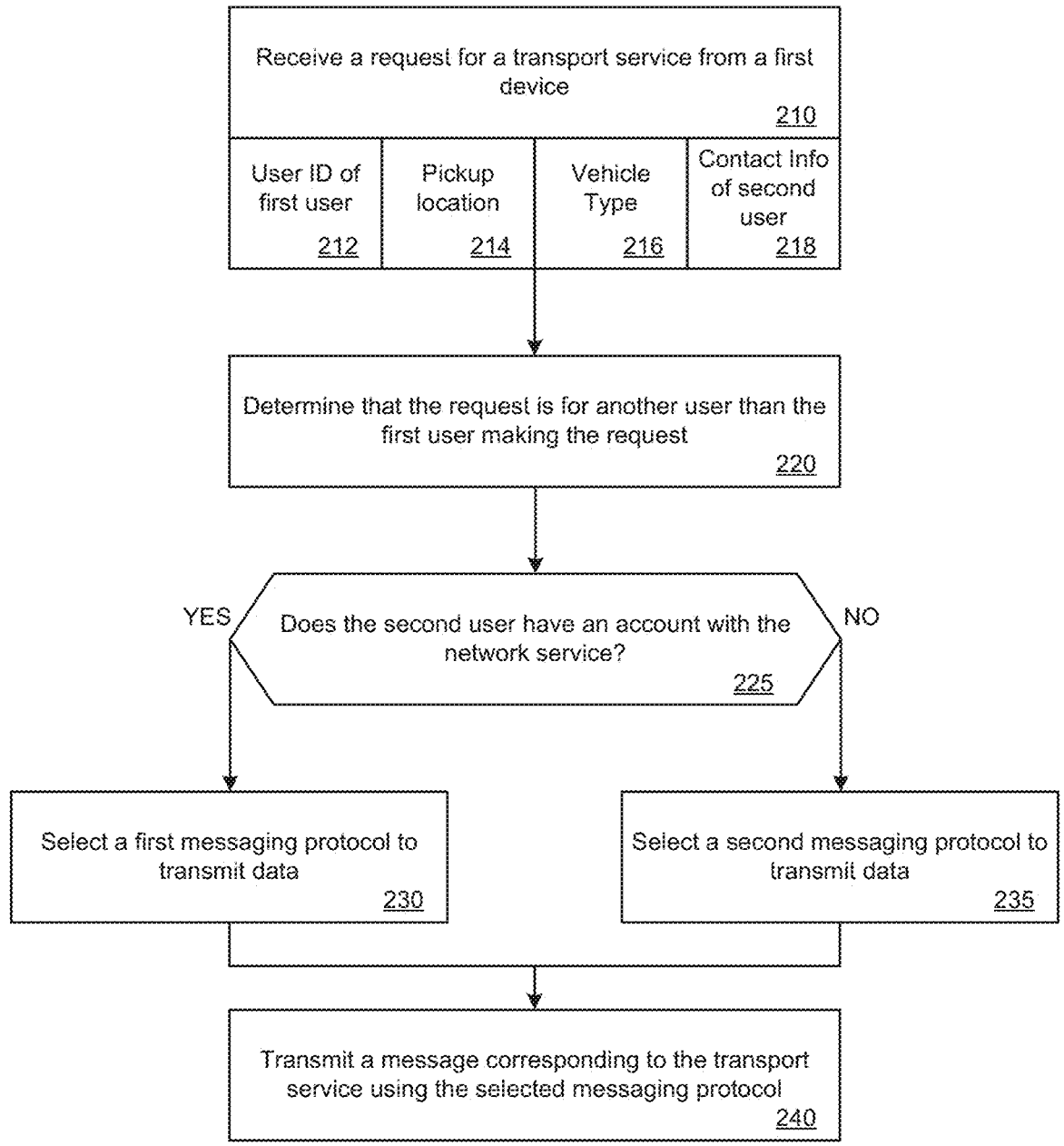
FIGS. 2A and 2B illustrate example methods of generating and transmitting data in connection with a transport service, according to an embodiment.
Figure 2B:
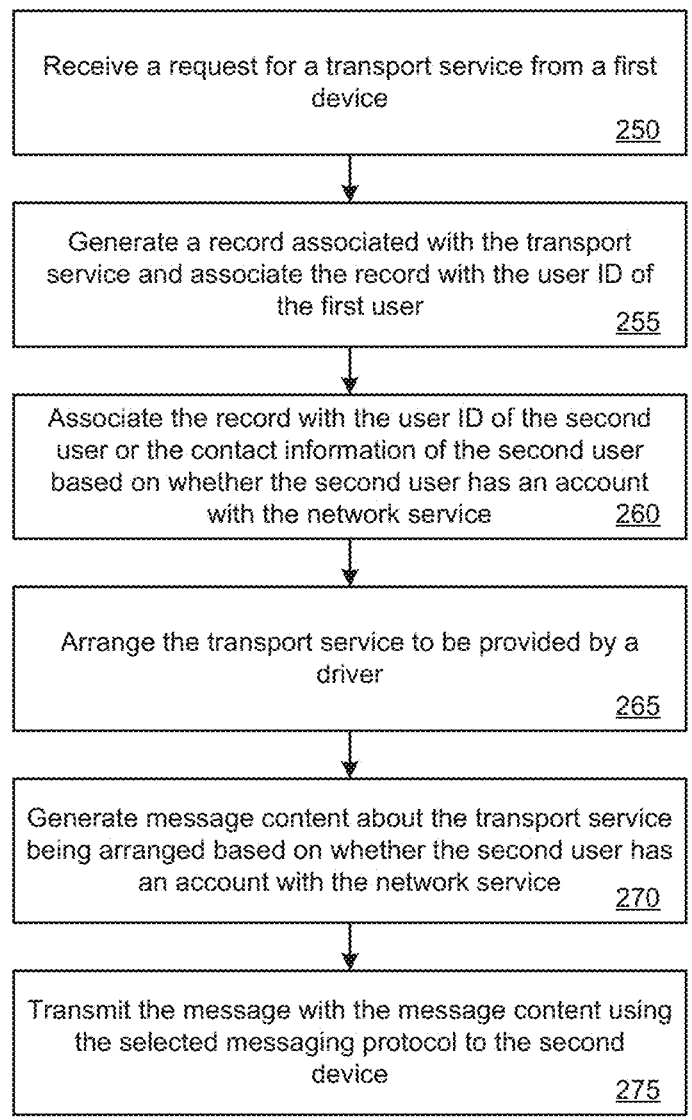
Figure 3:
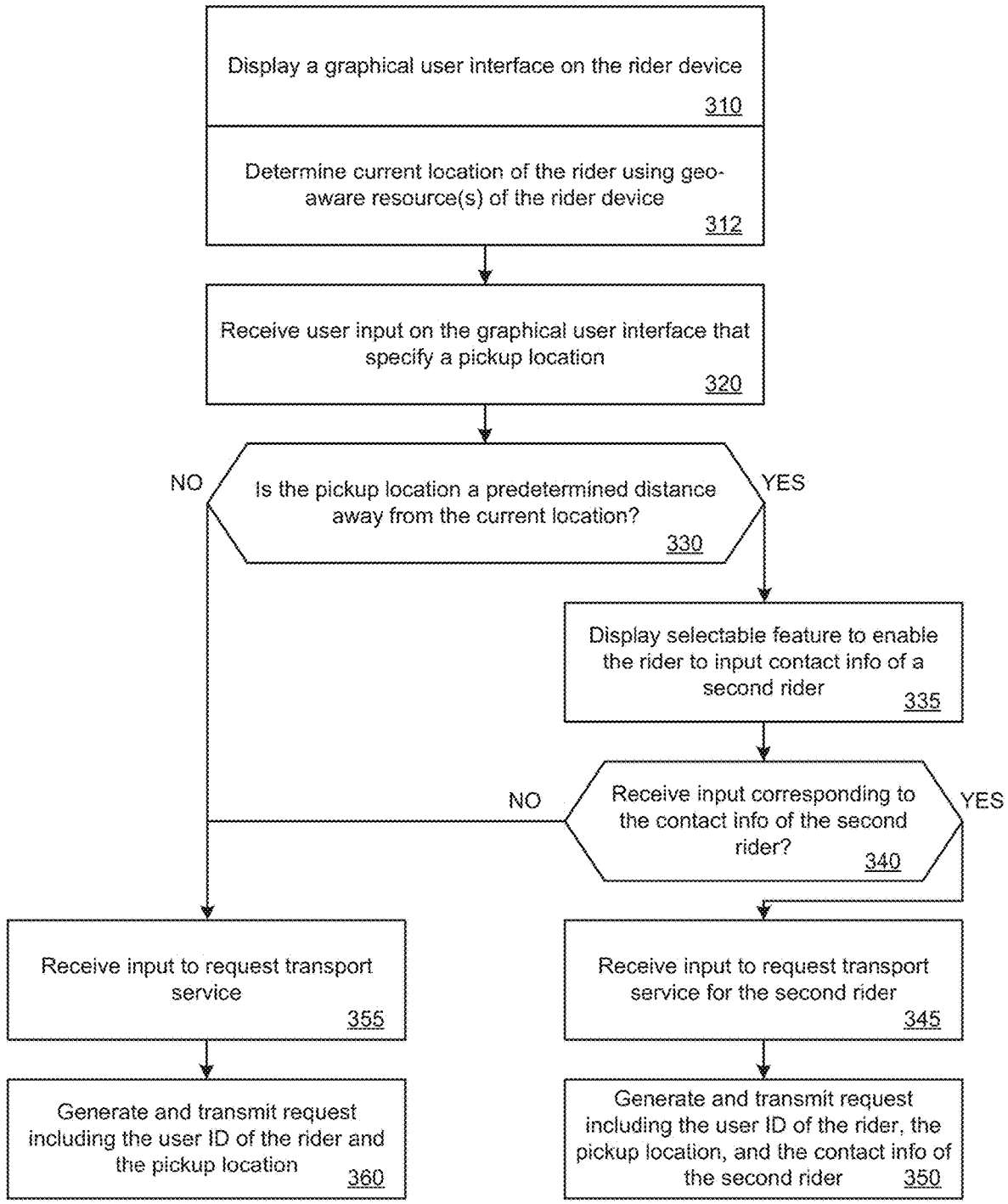
FIG. 3 illustrates an example method of generating a request for a transport service, in an embodiment.

FIGS. 2A and 2B illustrate example methods of generating and transmitting data in connection with a transport service, according to an embodiment. FIG. 3 illustrates an example method of generating a request for a transport service, in an embodiment. The methods such as described by examples of FIGS. 2A through 3 can be implemented using, for example, components described with the example of FIG. 1. Accordingly, references made to elements of FIG. 1 are for purposes of illustrating a suitable element or component for performing a step or sub-step being described.

Referring to FIG. 2A, the example method describes an operation of the system 100 to generate and transmit data in connection with a transport service. The system 100 can receive, over one or more networks, a request for a transport service from a first device (210). The first device can be operated by a first user of a network service and can run a client application that communicates with the system 100 that implements the network service. According to an example, the request can include a set of data, such as a user ID of the first user (212), a pickup location (214), and a vehicle type (216). As described herein, the system 100 can process a request for transport service made by a user for that user, and can also process a request for transport service made by a user for another user. In the latter example, the request for the transport service can further include a contact information for the second user (218) that the first user wishes to request a transport service for. The contact information can include a phone number, a name, an email address, and/or other identifying information of the second user.

In some examples, based on the data included in the request, the system 100 can determine whether the request from the first user is for that user or for another user. In the example of FIG. 2A, the system 100 can determine that the request is for another rider than the first user based on, for example, the existence of the contact information in the request (220). As an addition or an alternative, the first device can separately transmit the contact information of the second user after transmitting the request. For example, after making the request, the first user may subsequently decide that he or she wants to transfer the trip to the second user. In such an example, when the first user operates the client application to transfer the trip to the second user, the client application can transmit the contact information of the second user along with the user ID of the first user and/or the ID of the trip (e.g., the identifier of the trip entry). The system 100 can determine that the request is for another user in response to receiving the contact information even after receiving the request.

The system 100 can determine whether the second user has an account with the network service (225). In other words, the system 100 can determine whether the second user is an authorized user of the network service. The system 100 can search the client database 141 using the contact information of the second user to determine whether a matching account exists. If the second user has an account with the network service, the system 100 can select a first messaging protocol to use to transmit one or more messages about the transport service to a device of the second user (230). For example, the first messaging protocol can correspond to an application push notification protocol that enables messages associated with the client application and/or the mobile operating system to be displayed on the second user's device. The second user's device presumably stores the client application as the second user has a valid account with the network service and has installed the client application on the second user's device. Still further, the system 100 can determine, from the second user's account, the device (or operating system) type and/or the application version information to format the message accordingly using the first messaging protocol.

On the other hand, if the second user does not have an account with the network service, the system 100 can select a second messaging protocol as opposed to the first messaging protocol to use to transmit one or more messages about the transport service to the second user's device (235). For example, the second messaging protocol can correspond to an email protocol (e.g., POP, IMAP, STMP, etc.) or a text messaging protocol (e.g., SMS, MMS, instant messaging service, etc.). The second messaging protocol can be pre-configured by an administrative user of the system 100.

When a message about the transport service is to be transmitted to the second user's device, the system 100 can generate, format, and transmit the message to the second user's device using the selected messaging protocol (240). For example, the system 100 can determine the different instances when messages in connection with the transport service is to be transmitted to the second user's device. In this manner, despite the second user not having an authorized account with the network service or despite the second user not having a smartphone with capabilities to display a web browser or user interface feature of an application, the second user can still receive information when the transport service is arranged for the second user, or when the driver arrives at the pickup location of the second user, etc. As an addition or an alternative, the system 100 can also transmit one or more messages to the first user's device (e.g., concurrently as the one or more messages are transmitted to the second user's device) using a push notification messaging protocol or an in-application messaging protocol. Data received using application messaging protocols can also enable the client application to display, on a user interface, the progress of the transport service, including the location of the driver on map content, driver information, and one or more selectable features.

As an addition or an alternative, when a message is transmitted to the second user's device using the selected messaging protocol, the system 100 can receive feedback information whether the message was successfully transmitted or not. If the message was not successfully transmitted to the second user's device, the system 100 can select a different messaging protocol to transmit the message. For example, if the selected messaging protocol is an email messaging protocol, the system 100 can select a more device-common messaging protocol (e.g., a protocol that is more widely available across different classes of devices) as compared to the email messaging protocol, such as a text messaging protocol (e.g., SMS) to transmit the message.

Still further, according to some implementations, if the second user does not have an associated account with the network service, the system 100 can select a second messaging protocol based on a geographic region in which the pickup location for the second user is located. For example, because the most commonly used messaging protocol or the industry standard messaging protocol may vary depending on geographic region (e.g., China as compared to the United States or India or Europe, etc.), the system 100 can select, for the second messaging protocol, the specified messaging protocol that is most commonly used in that region. In this manner, according to such an example, the messaging protocol that is potentially most effective to transmit messages can be used to transmit messages to the second user's device.

FIG. 2B illustrates a method that is at least partially performed by the system 100 in conjunction with the method described in FIG. 2A. The system 100 can receive a request for transport service from a first device operated by a first user, such as described in FIG. 2A (250). In this example, the request can be for a transport service for a second user. The system 100 can generate a record, e.g., a data structure, associated with the transport service and associate the record with the user ID of the first user (e.g., the user that requested the trip) (255). The record can correspond to a trip entry for that transport service. The record can be stored in a trip database that is accessible by the system 100.

The system 100 can also associate the record or trip entry with the user ID of the second user or the contact information of the second user based on whether the second user has an account with the network service (260). For example, if the second user has an account stored in the client database, the user ID of the second user (or identifier associated with the second user's account) can be associated with the record so that data about the transport service can also appear in the second rider's trip history (e.g., stored information about completed trips) despite the transport service having been requested by the first user. The record can also store information about the requested transport service, such as the vehicle type selected, the time the request was made, the pickup location and/or destination location specified, and/or information indicating that the requesting user (i.e., the first user) transferred the trip to another user (i.e., the second user).

The system 100 can subsequently arrange the transport service to be provided by a driver (265). According to variations, the system 100 can perform a service arrangement process or driver selection process based on different factors or conditions. In one example, a pool of candidate drivers can be identified for the transport service based on the current locations and status information of those driver and based on the pickup location (and/or the destination location). The driver forms the pool that is closest to the pickup location by distance or by estimated time of travel can be selected to provide the transport service for the second user. Additionally, other factors may be used and weighted to rank the pool of drivers in addition to the driver's closeness to the pickup location, such as the driver ratings, the destination of the second user, if any, etc.

According to an example, once the transport service has been arranged for the second user, the system 100 can generate a message (or select a template message structure) in which to include information about the transport service based on whether the second user has an account with the network service (270). As described with respect to FIG. 1 and FIG. 2A, if the second user has an account with the network service, the system 100 can select a first messaging protocol to use to transmit messages to the second user's device (e.g., the second device). Alternatively, if the second user does not have an account with the network service, the system 100 can select a second, different, messaging protocol to use to transmit messages to the second device. Because different messaging protocols are used, the content of the message and/or the structure or formatting of the message can also vary based on whether the second user has an account with the network service.

For example, if the system 100 identifies the stored user account of the second user, the second user presumably operates a smartphone device that can receive push notifications for the client application. The data transmitted to the second device can be an application push notification that includes textual content, "Ozzy has requested a trip for you" or "Ozzy has transferred this trip to you." In this example, "Ozzy" is the first user that made the request for the second user. Such content is sufficient to inform the second user that a transport service has been arranged on behalf of the second user. When the second user selects the notification (or independently launches the client application) on the second device, the client application can display additional information about the transport service that was arranged for the second user. According to an example, such information displayed by the client application on the second device can be similar to or identical to the information displayed by the client application on the first device. In this manner, the second user can view a current location of the driver, the driver information, the vehicle information, the estimated time of arrival, etc., on the client application.

In another example, if the system 100 does not identify an account for the second user, the system 100 can generate a message to be transmitted using the second messaging protocol, such as through a text messaging protocol, and include more detailed information in the content of the message as compared to the information in a push notification message (e.g., the first messaging protocol). Because the second user is presumably not a user of the network service and does not use the client application (or does not have a smartphone for operating such a client application), the system 100 can include detailed information about the transport service as the content of the message. The content can be a graphic image or textual content that states, for example, "Ozzy has transferred this trip to you. Your driver, Nikunj, will pick you up in an Aston Martin, DB7 Vantage with the license plate # NOW007. The driver can be contacted at (805)319-7956. You can follow the trip here: http://example.link.com." As such, in one example, for a message that is to be transmitted using the first messaging protocol (e.g., based on the second user having an account with the network service), the content included in that message can be shorter and less detailed than a message that is to be transmitted using the second messaging protocol. The system 100 can then transmit the message with the specific content using the selected messaging protocol to the second device (275).

In some examples, one or more of the steps described in FIG. 2B can be performed in conjunction with or concurrently with one or more steps in the example of FIG. 2A. For example, step 255 of FIG. 2B can be performed before, after, or concurrently with step 220 and/or step 225 of FIG. 2A. In another example, step 260 of FIG. 2B can be performed concurrently with or after step 225 and/or steps 230/235 of FIG. 2A. Still further, as an addition or an alternative, the system 100 can generate and transmit a messaging using a selected messaging protocol (i) when the driver is being selected for the second user (e.g., before the transport service is arranged), in order to notify the second user that a transport service has been requested for the second user by the first user and/or to notify that a driver is being selected, (ii) when the driver is approaching the pickup location or is within a predetermined distance of the pickup location, and/or (iii) when the transport service has ended.

FIG. 3 illustrates an example method of generating a request for a transport service on a computing device. FIG. 3 is also described with FIGS. 4A through 4D for purposes of illustration. According to an example, the method of FIG. 3 can be performed on a computing device operated by a first user of a network service, such as a rider device 180 of FIG. 1. A rider can operate a designated client application on the rider device, which can display a graphical user interface on the rider device (310). The graphical user interface can correspond to a home page graphical user interface, such as the user interface 400 of FIG. 4A, which can include map content 402 showing a map of a region near or around a current location 404 of the rider (e.g., the current location of the rider device). For example, the client application can determine the current location of the rider or the rider device using one or more geo-aware resources of the rider device, such as a GPS receiver, a Bluetooth transceiver, and/or a wireless transceiver (312).

The client application can receive user input on the graphical user interface that specifies a pickup location (320). For example, in FIG. 4A, the user interface 400 can include a graphic icon or pin 406 corresponding to a pickup location that the rider can specify for a transport service. The rider can move the pin 406 to a different point on the map content 402 via input on the rider device (e.g., touch input on the touch-sensitive display of the rider device) or provide input in the location text box 408 to specify a pickup location (e.g., an address or a landmark or point of interest). In one example, if the rider does not move the pin 406 or provide input in the location text box 408, by default, the pin 406 can be positioned at or near the current location 404 of the rider. The rider can also specify a vehicle type, such as by selecting a vehicle type on the selectable feature that includes multiple vehicle types. In the example of FIG. 4A, the rider has selected the vehicle type called "uberX" as the vehicle type in which he or she wishes to request a transport service.

According to an example, the client application can determine if the pickup location is a predetermined distance away from the current location (330). When the user specifies a pickup location by moving the pin 406 or by providing input in the location text box 408, the client application can perform a calculation based on the location data point (e.g., a geo-coordinate, such a latitude and a longitude coordinate) of the pickup location and the location data point of the current location. The calculation can correspond to a Cartesian distance between the two points or a Haversine distance between the two points. Alternatively, the client application can determine a geographic region having a shape (e.g., a circle, an ellipse, a hexagon, a square, etc.) with the current location data point substantially in the center or middle of the region. The client application can determine if the pickup location data point is within or outside that geographic region.

If the pickup location is determined to be a predetermined distance away from the current location (e.g., 500 meters), the client application can dynamically display a selectable feature on a user interface of the client application to enable the rider to "transfer" the trip or transport service to someone else (335). The predetermined distance can be configurable by an administrative user of the network service (e.g., an operator of the system 100 of FIG. 1). In some examples, the distance between the pickup location and the current location being greater than a predetermined distance can indicate that the rider may not be requesting a transport service for himself or herself, but may instead be requesting a transport service for someone else.

Figure 4B:
FIGS. 4A through 4E illustrate examples user interfaces that are displayed on computing devices, according to one or more embodiments.
Figure 4A:
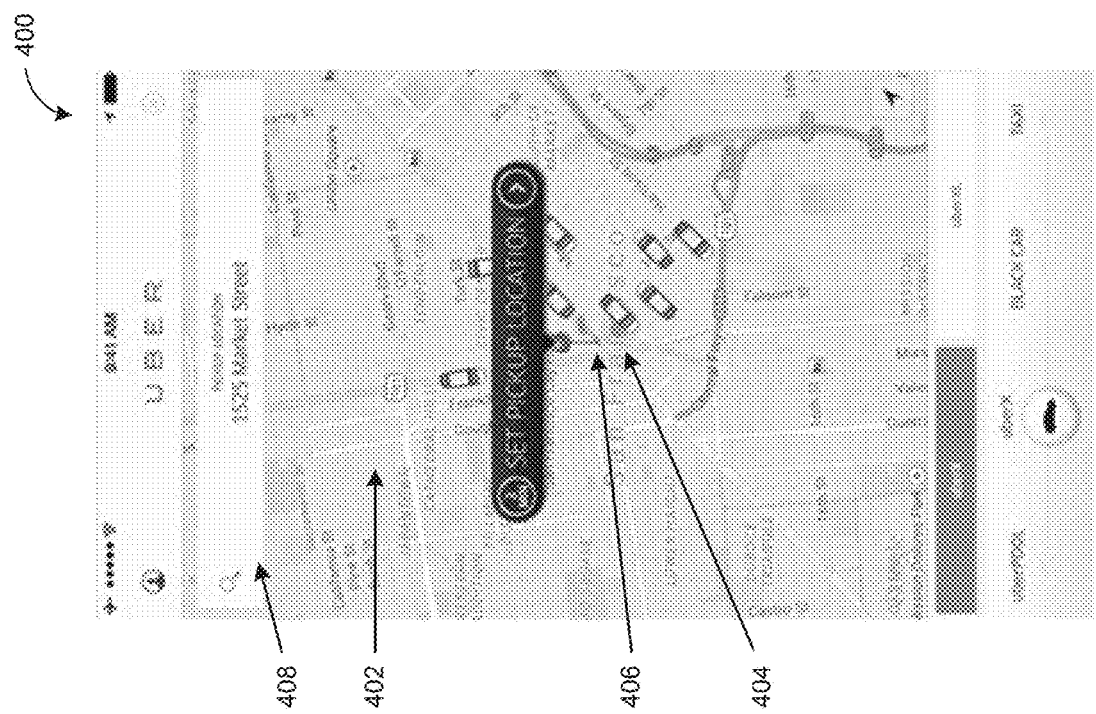

Referring to FIG. 4B, an example of the selectable feature is shown in the confirmation user interface 410 of the client application. The confirmation user interface 410 can be displayed when the rider makes an initial request for transport service or selects the feature "SET PICKUP LOCATION" as illustrated in FIG. 4A. In the example of FIG. 4B, the confirmation user interface 410 can dynamically display the selectable feature 414, which can include textual content for the rider, such as "Trip for someone else? Transfer Trip." The selectable feature 414 can be displayed in response to the client application determining that the pickup location is at least a predetermined distance away from the current location of the rider. In this case, the confirmation user interface 410 shows the pin 406 at a location corresponding to 1788 Pacific Avenue (as seen in the location text box 408), which is more than the predetermined distance away from the current location (near Market St. and Van Ness Ave., as illustrated in FIG. 4A).

In one example, if the rider wishes to request a transport service for another user, the rider can select the selectable feature 414. On the other, if the rider wishes to not transfer the trip, the rider can simply request the transport service by confirming the request (e.g., select "request uberX" on the confirmation user interface 410 of FIG. 4B). In such an example, even if the pickup location is more than a predetermined distance away from the current location, the rider can make a request for a transport service using the specified pickup location. If the rider selects the selectable feature 414, however, the client application can access the rider's contacts or the phone application on the rider device (e.g., via an API) and display the contacts user interface 420 of FIG. 4C in the client application.

The contacts user interface 420 of the client application can include a list of contacts 424 that are stored in the rider's contacts or phone application. Each stored contact 424 can include contact information, such as a name, a phone number, and/or an email address, etc. In addition, the contacts user interface 420 can include an input text box 426 in which the rider can input a name (to search the list of contacts 424) or input a phone number of the person the rider wishes to request the transport service for (e.g., the rider may not have the person's contact stored in the contact or phone application). In some examples, the contacts user interface 420 can also include a dialog box 428 that provides information to the rider, indicating that the identified person will have control of the trip but that the rider will still be charged for payment of the trip.

Figure 4D:
Figure 4C:
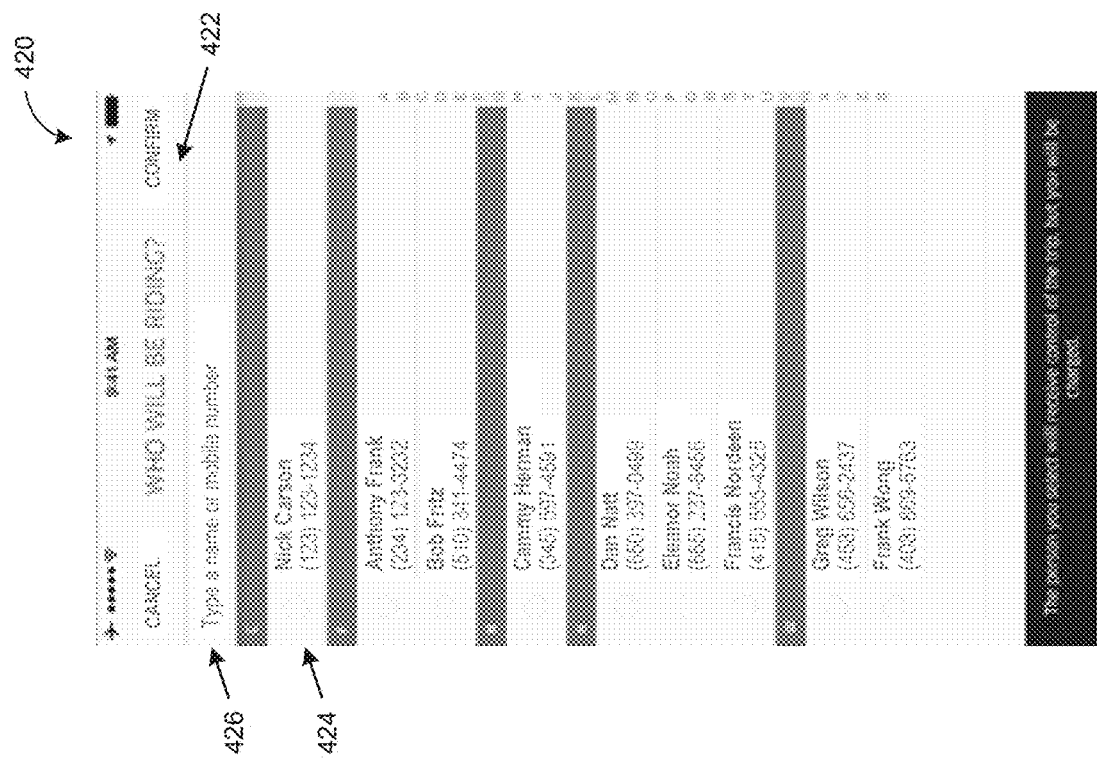

Referring back to FIG. 3, the client application can determine if the rider has provided input corresponding to the contact information of person (e.g., the second rider) that the rider wants to request the transport service for (340). For example, as illustrated in FIG. 4D, the rider can select a contact 424, such as Nick Carson, which will populate the name "Nick Carson" in the input text box 426, or the rider can input a phone number in the input text box 426. The rider can further confirm that he or she wants to transfer the trip to Nick by selecting the confirmation feature 422.

After providing input corresponding to the second rider, the client application can re-display the confirmation user interface, e.g., in this case, confirmation user interface 430 of FIG. 4D, which includes information about the trip being transferred to Nick. In one example, the confirmation user interface 430 can include, in the selectable feature 432, information confirming that the trip is for Nick. The rider can select this feature 432 to change or cancel transferring the trip to Nick. The confirmation user interface 430 can also dynamically alter the request feature 434 to provide visual feedback for the rider indicating that the trip will be transferred (e.g., as compared to the confirmation user interface 410 of FIG. 4B). When the rider confirms or requests the transport service by selecting the request feature 434, the client application can receive input to request transport service for the second rider (345), and the client application can generate a request for transport service and transmit the request to the network service (e.g., transmit to the system 100 of FIG. 1) (350). The request can include the user ID of the rider, the pickup location data point, and the contact information of the second rider. Based on the data in the request, the system 100 can then process the request accordingly, such as described in FIGS. 1 through 2B.

Referring back to step 330 of FIG. 3, however, if the pickup location is within the predetermined distance from the current location, the client application can operate in a default mode. The client application does not display a feature to enable the rider to transfer the trip. Similarly, the client application can operate in a default mode if the rider does not provide input corresponding to the contact information of the second rider. The client application can receive input to request a transport service from the rider (355), and can generate and transmit a request for transport service for the rider (360). The request can include the user ID of the rider and the pickup location data point.

As an addition or an alternative, as opposed to computing the distance of the pickup location from the current location, the client application can display the selectable feature 414 on the confirmation user interface 410 of FIG. 4B at any time. In such an example, the rider can always have the option to request the transport service (or transfer the trip) to another rider. Still further, in another example, the rider can have the option to transfer the trip after the request for the transport service is made and transmitted to the system 100.

For example, the client application can display a plurality of features for a plurality of different services in response to a user input (e.g., selection of a menu or settings of a trip). Such a menu can include features to enable the rider to share the fare, to contact the driver, share information about the trip to other people, or to transfer the trip to another rider. In this manner, even after the request is made, such as when the driver is traveling to the pickup location, the rider can transfer the trip to another rider.

Figure 4E:
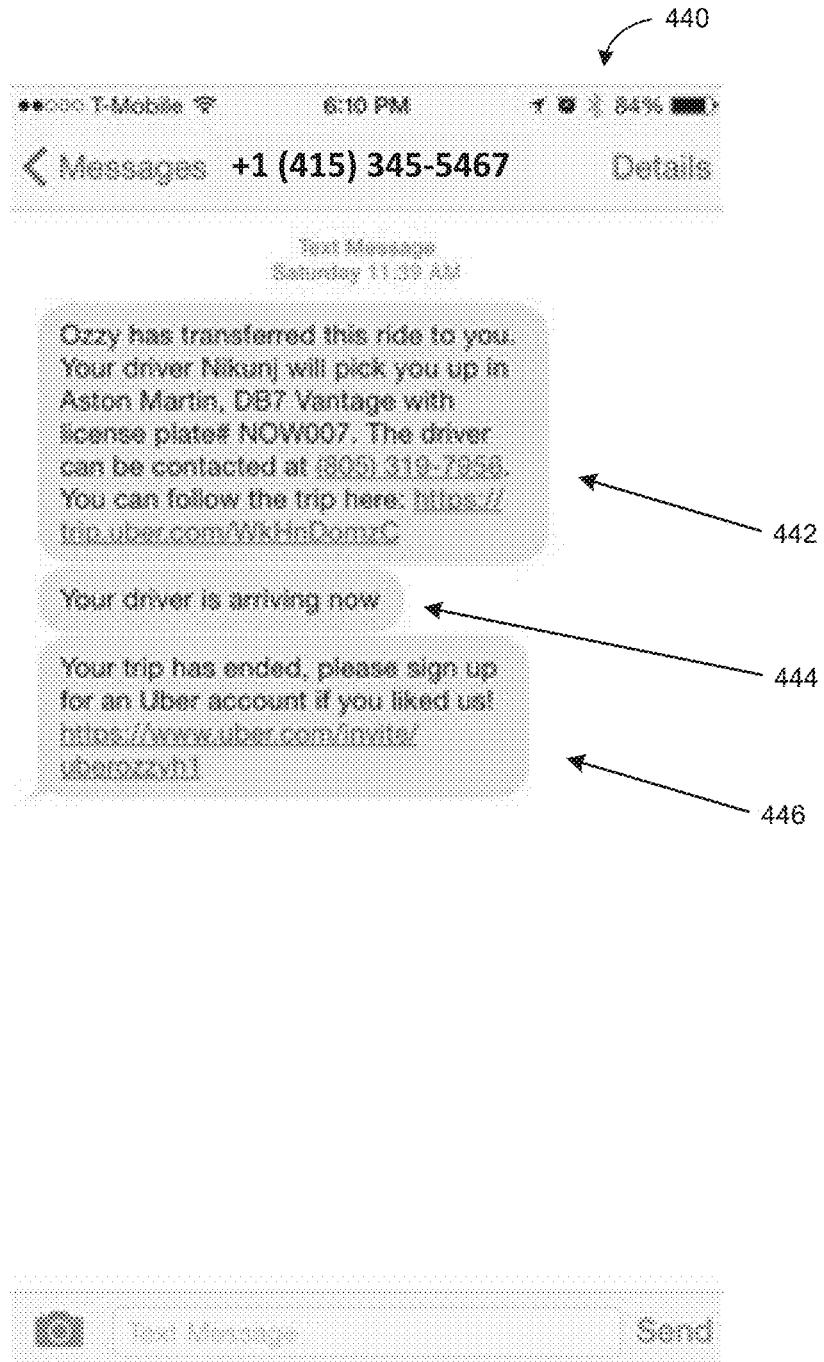

FIG. 4E illustrates an example of a user interface of a text messaging application operating on a computing device. The user interface 440 of FIG. 4E can be displayed, for example, on a display of a computing device of a second user, such as Nick (e.g., the second device). In the example of FIG. 4E, the second user, Nick, does not have an account with the network service and/or does not have the client application 181 stored on the second device. Accordingly, the user interface 440 can include one or more messages transmitted by the network service using a selected messaging protocol, such as a text messaging protocol, as opposed to another messaging protocol, such as an application push notification or email messaging protocol.

Referring to FIG. 1 for reference, when the system 100 arranges the transport service for the second user by selecting a driver, the system 100 can transmit a first message about the arranged trip to the second device using a selected messaging protocol, such as a text messaging protocol in the example of FIG. 4E. The user interface 440 of the text messaging application of the second device can identify a phone number used by the system 100 (e.g., 415-345-5467) and can display the first message 442. The first message 442 includes data pertaining to the arranged transport service, including the name of the first user (e.g., Ozzy) that made the request, the selected driver information and vehicle information, and contact information to communicate with the driver. The first message 442 can also include a link to enable the second user to view, on a browser application on the second device, the real-time or close to real-time progress of the driver and/or the trip on a web page. In some instances, the first message 442 can further include the pickup information, such as 1788 Pacific Avenue (but not shown in FIG. 4E). In this manner, the second user can have the necessary information about the transport service despite not having requested the trip and not having an account with the network service.

The system 100 can provide additional messages using the selected messaging protocol to the second device, such as a second message 444 indicating that the driver is approaching the pickup location (e.g., "driver is arriving now"). Still further, the system 100 can also provide a third message 446 when the transport service has completed, and in the content of the third message 446, can include a link to enable the second user to sign up for an account with the network service. The system 100 can include the link based on the determination that the second user does not have a stored account in the client database.

In some examples, the link can be associated with the account or identifier (or promotional/referral code) of the first user that requested the trip for the second user. The link can be programmatically generated to be associated with the first user and to enable the second user to visit a web page to sign up or create an account with the network service. In such an example, if the second user selects the link, views the web page to sign up, and signs up for an account with the network service, the first user can receive the promotional benefit (e.g., a credit or dollar amount discount for using the network service for the referral code) in return. In addition, the first user can also receive some financial benefit (e.g., a credit or a discount) for referring the second user if the second user signs up for the account by accessing the programmatically generated link. In these examples, by programmatically generating the link and transmitting it to the second user (via a selected messaging protocol), the second user will be more likely to sign up for an account, having experienced the network service by receiving the transport service requested by the first user.

Hardware Diagrams

Figure 5:
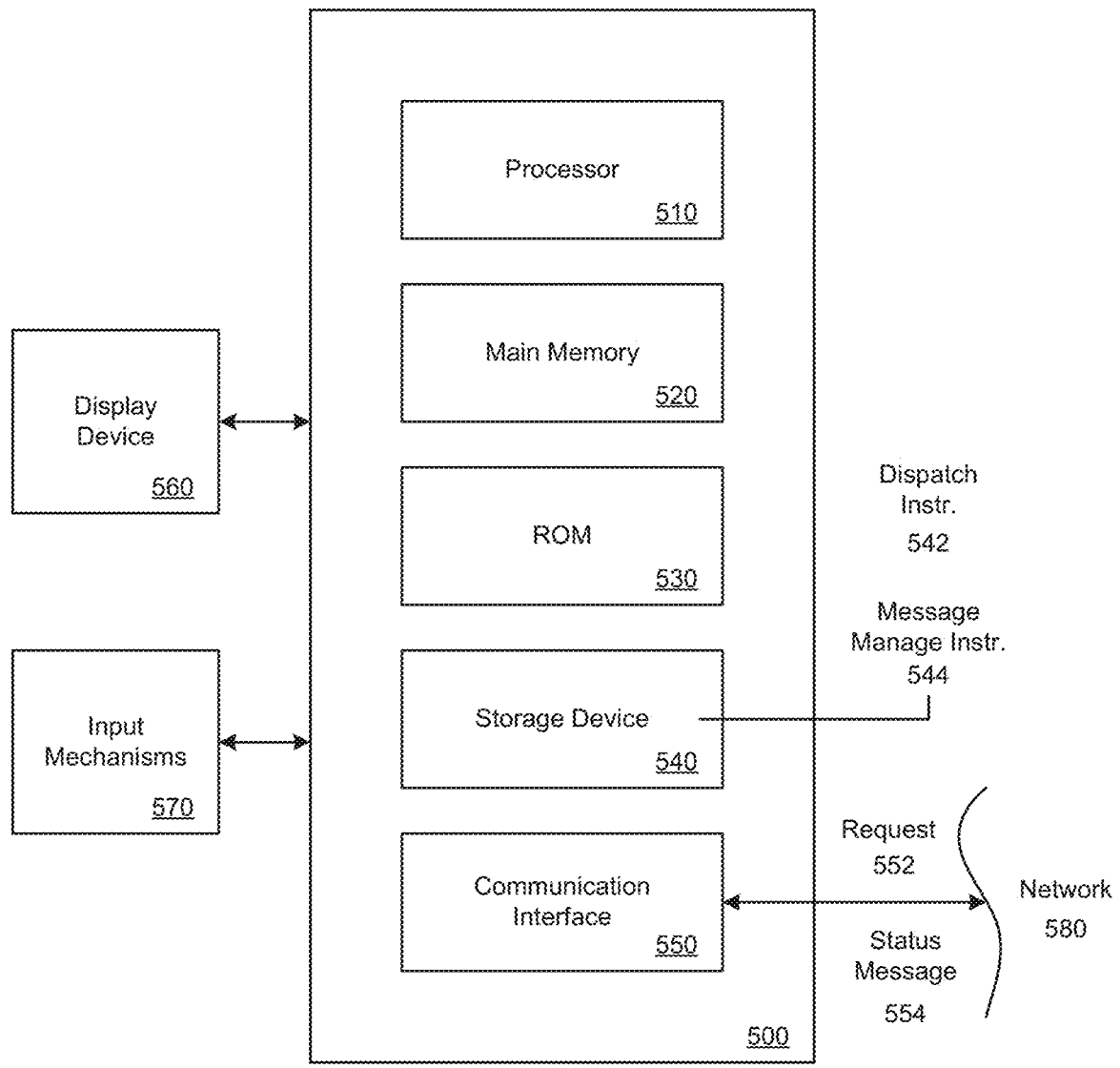
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, the system 100 may be implemented using a computer system such as described by FIG. 5. The system 100 may also be implemented using a combination of multiple computer systems as described by FIG. 5.

In one implementation, a computer system 500 includes processing resources 510, a main memory 520, a read only memory (ROM) 530, a storage device 540, and a communication interface 550. The computer system 500 includes at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions, including dispatch instructions 542, message manage instructions 544, and other instructions, such as driver tracking instructions. The storage device 540 can also store a plurality of databases and entries, such as described in FIG. 1.

For example, the processor 510 can execute the dispatch instructions 542 to implement logic for processing a request for transport service from a first user, determining whether the request is for a second user, determining whether the second user has an account in the client database, and selecting a driver to provide the transport service, such as described in FIGS. 1 through 4E. The processor 510 can execute the message manage instructions 544 to implement logic for generating and formatting messages based on a specified messaging protocol, such as described in FIGS. 1 through 4E.

The communication interface 550 can enable the computer system 500 to communicate with one or more networks 580 (e.g., cellular network) through use of the network link (wireless or wireline). Using the network link, the computer system 500 can communicate with one or more other computing devices, such as rider devices and driver devices (including a second device 170 as described in FIG. 1), and/or one or more other servers or datacenters. In some variations, the computer system 500 can receive a request 552 for transport service from a first device via the network link. The computer system 500 can determine, based on data from the request 552, whether the request is made for a second user and can select a messaging protocol to use to communicate with a device of the second user. When the transport service is arranged and/or during the progress of the transport service, the computing system 500 can transmit one or more status messages 554 to the second device using the selected messaging protocol, such as described in FIGS. 1 through 4E.

The computer system 500 can also include a display device 560, such as a cathode ray tube (CRT), an LCD monitor, or a television set, for example, for displaying graphics and information to a user. One or more input mechanisms 570, such as a keyboard that includes alphanumeric keys and other keys, can be coupled to the computer system 500 for communicating information and command selections to the processor 510. Other non-limiting, illustrative examples of input mechanisms 570 include a mouse, a trackball, touch-sensitive screen, or cursor direction keys for communicating direction information and command selections to the processor 510 and for controlling cursor movement on the display 560.

Examples described herein are related to the use of the computer system 500 for implementing the techniques described herein. According to one embodiment, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
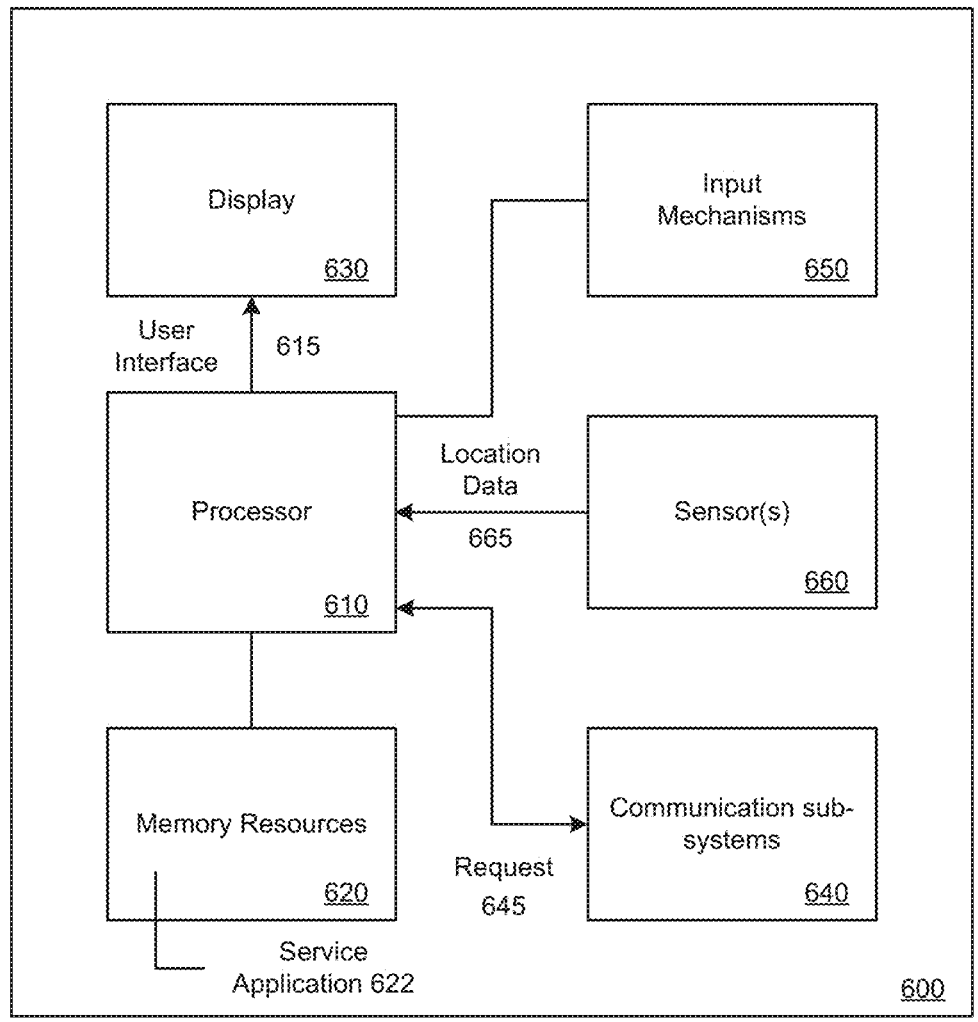
FIG. 6 is a block diagram that illustrates a mobile computing device upon which embodiments described herein may be implemented.

FIG. 6 is a block diagram that illustrates a mobile computing device upon which embodiments described herein may be implemented. In one embodiment, a computing device 600 may correspond to a mobile computing device, such as a cellular device that is capable of telephony, messaging, and data services. The computing device 600 can correspond to a rider device or a driver device. Examples of such devices include smartphones, handsets or tablet devices for cellular carriers. The computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), one or more sensors 660, including a location detection mechanisms (e.g., GPS receiver), and a camera (not shown in FIG. 6). In one example, at least one of the communication sub-systems 640 sends and receives cellular data over data channels and voice channels.

The processor 610 can provide a variety of content to the display 630 by executing instructions and/or applications that are stored in the memory resources 620. For example, the processor 610 is configured with software and/or other logic to perform one or more processes, steps, and other functions described with implementations, such as described by FIGS. 1 through 5, and elsewhere in the application. In one example, the processor 610 can execute instructions and data stored in the memory resources 620 in order to operate a service application 622, as described in FIGS. 1 through 5. Depending on implementation, the service application 622 can correspond to a client application or a driver application. Still further, the processor 610 can cause one or more user interfaces 615 to be displayed on the display 630, such as one or more user interfaces provided by the driver application. Input can be provided on the driver application through a combination of the input mechanisms 650 and the display 630, for example, such as through use of a touch-sensitive display device.

In the example in which the computing device 600 corresponds to a rider device, such as a device operated by a first user, the first user can operate the computing device 600 to view information about the current state of the network service. The service application 622 can be run on the computing device 600, which can communicate with the network service via the communication sub-systems 640. The service application 622 can also communicate with the sensor(s) 660 to determine location data 665 corresponding to the current location of the computing device 600. The first user can operate the service application 622 using the user interface 615 (by providing input on a touch-sensitive display 630, 650) and specify a pickup location and/or whether the first user wants to transfer the trip to another user. According to one example, the computing device 600 can perform a distance computation between the current location (based on the location data 665) and the specified pickup location to adjust the content of a user interface 615, such as described in FIGS. 1 and 3 through 4D. Based on the input provided by the user, the computing system can generate and transmit a request 645 for transport to the network service via the communication sub-systems 640. The request 645 can include different sets or fields of data based on whether the first user specified a contact information of a second user or not. While FIG. 6 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method of arranging a transport service, the method being performed by a computing system and comprising:
   receiving, from a first computing device of a first user, a start location, a destination location, information identifying a second user who is not the first user, and an indication that a transport service being requested is for the second user;
   assigning a driver to provide the transport service for the second user based, at least in part, on the start location;
   transmitting, to the first computing device of the first user, a first message including information about the driver;
   generating a link to a web page associated with the transport service, the web page including progress information of the driver;
   transmitting, to a second computing device of the second user, a second message including information about the driver and the link to the web page; and
   transmitting data to update the progress information of the driver on the web page.

2. The method of claim 1, wherein the second message is transmitted to the second computing device using a push notification protocol, and further comprising:
   determining that the second computing device did not receive the second message;
   selecting a second messaging protocol; and
   retransmitting the second message to the second computing device using the second messaging protocol.

3. The method of claim 2, wherein the second messaging protocol is a text message protocol.

4. The method of claim 1, wherein the information identifying the second user is a phone number, a name, an email address, or an account identifier of the second user.

5. The method of claim 1, wherein the indication that the transport service is for the second user is received along with or as part of a request for the transport service.

6. The method of claim 1, wherein the first message corresponds to an application notification, and wherein the second message corresponds to a short message service (SMS) message.

7. The method of claim 1, further comprising:
   transmitting data to the first computing device to update progress information of the driver on a client application running on the first computing device.

8. The method of claim 1, wherein the second message also includes textual content that identifies a vehicle of the driver.

9. The method of claim 1, further comprising:
   transmitting, to a computing device of the driver, a notification that includes an identifier of the second user.

10. A computing system, comprising:
    one or more communication interfaces;
    one or more processors coupled to the one or more communication interfaces; and
    one or more memory resources storing instructions that, when executed by the one or more processors, causes the computing system to:
    receive, from a first computing device of a first user, a start location, a destination location, information identifying a second user who is not the first user, and an indication that a transport service being requested is for the second user;
    assign a driver to provide the transport service for the second user based, at least in part, on the start location;
    transmit, to the first computing device of the first user, a first message including information about the driver;
    generate a link to a web page associated with the transport service, the web page including progress information of the driver;
    transmit, to a second computing device of the second user, a second message including information about the driver and the link to the web page; and
    transmit data to update the progress information of the driver on the web page.

11. The computing system of claim 10, wherein the second message is transmitted to the second computing device using a push notification protocol, and wherein the instructions further cause the computing system to:
    determine that the second computing device did not receive the second message;
    select a second messaging protocol; and
    retransmit the second message to the second computing device using the second messaging protocol.

12. The computing system of claim 11, wherein the second messaging protocol is a text message protocol.

13. The computing system of claim 10, wherein the information identifying the second user is a phone number, a name, an email address, or an account identifier of the second user.

14. The computing system of claim 10, wherein the indication that the transport service is for the second user is received along with or as part of a request for the transport service.

15. The computing system of claim 10, wherein the first message corresponds to an application notification, and wherein the second message corresponds to a short message service (SMS) message.

16. The computing system of claim 10, wherein the instructions further cause the computing system to:
    transmit data to the first computing device to update progress information of the driver on a client application running on the first computing device.

17. The computing system of claim 10, wherein the second message also includes textual content that identifies a vehicle of the driver.

18. The computing system of claim 10, wherein the instructions further cause the computing system to:
    transmit, to a computing device of the driver, a notification that includes an identifier of the second user.

19. A non-transitory computer-readable medium storing instructions that, when executed by one or more processors of a computing system, cause the computing system to:
    receive, from a first computing device of a first user, a start location, a destination location, information identifying a second user who is not the first user, and an indication that a transport service being requested is for the second user;
    assign a driver to provide the transport service for the second user based, at least in part, on the start location;
    transmit, to the first computing device of the first user, a first message including information about the driver;
    generate a link to a web page associated with the transport service, the web page including progress information of the driver;
    transmit, to a second computing device of the second user, a second message including information about the driver and the link to the web page; and
    transmit data to update the progress information of the driver on the web page.

20. The non-transitory computer-readable medium of claim 19, wherein the second message is transmitted to the second computing device using a push notification protocol, and wherein the instructions further cause the computing system to:
    determine that the second computing device did not receive the second message;
    select a second messaging protocol; and
    retransmit the second message to the second computing device using the second messaging protocol.

* * * * *